United States Patent [19]

Black et al.

[11] Patent Number: 4,835,624
[45] Date of Patent: May 30, 1989

[54] HIGH-SPEED MAGNETIC ENCODING APPARATUS AND METHOD

[75] Inventors: Charles H. Black, Des Plaines; Vincent LaSusa, Mt. Prospect, both of Ill.

[73] Assignee: Scientific Games of California, Inc.

[21] Appl. No.: 58,348

[22] Filed: Jun. 5, 1987

[51] Int. Cl.⁴ ............................ G11B 5/04; G11B 5/48
[52] U.S. Cl. ......................................... 360/2; 360/104
[58] Field of Search ............... 360/2, 15, 104; 101/66, 101/67

[56] References Cited
U.S. PATENT DOCUMENTS
4,638,378  1/1987  Zanessi .................................. 310/15

Primary Examiner—Vincent P. Canney
Attorney, Agent, or Firm—Jenner & Block

[57] ABSTRACT

Apparatus for high speed bulk magnetic encoding of lottery tickets passes a web of tickets by an encoding apparatus which supports plural skates each having wheels or rollers which ride along the surface of the web to provide a controlled gap between the web and a magnetic write head. Also included on the skate are a magnetic read head and an inkjet print head. After encoding and printing, the perforations in the web are bursted, and the web is sliced into individual magnetically encoded lottery tickets.

19 Claims, 2 Drawing Sheets

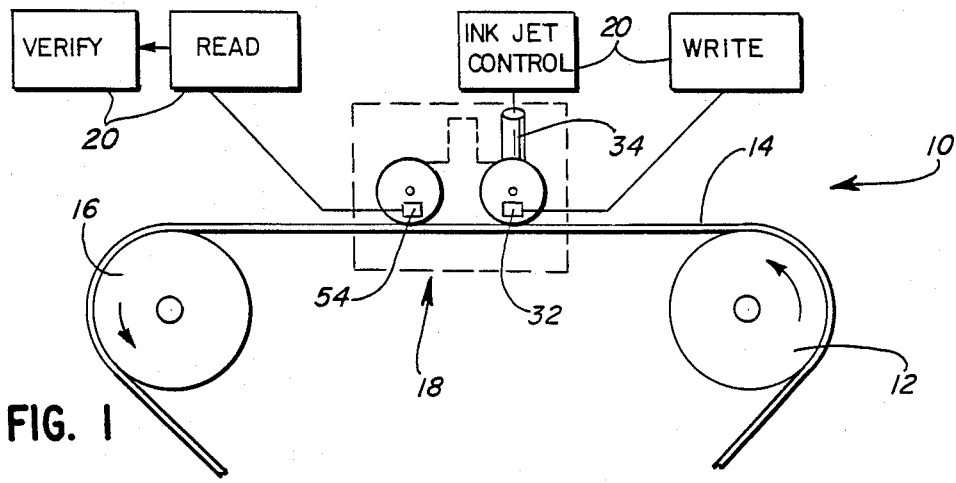
FIG. 1
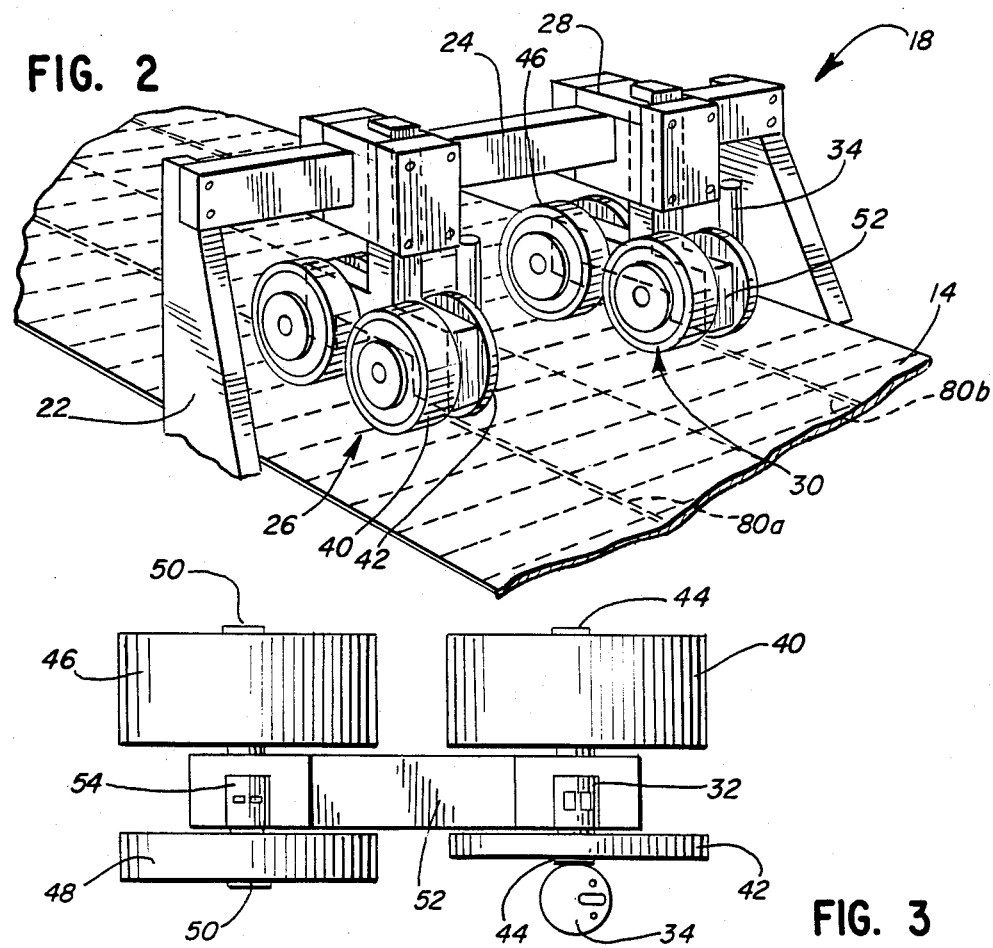
FIG. 2
FIG. 3

HIGH-SPEED MAGNETIC ENCODING APPARATUS AND METHOD

BACKGROUND OF THE INVENTION

The present invention relates to an apparatus and method for continuously encoding magnetic information on magnetically encodable documents processed in bulk form, such as lottery tickets or the like.

As described in a patent application filed concurrently herewith by William Behm, David Hurst, Frank Rice and Martin Cohen for "Adhesive For Magnetically Storing Information, Information Bearing Article Incorporating The Adhesive And Method", and assigned to the same assignee as this application, and a patent application filed concurrently herewith by William Behm entitled "Lottery Ticket Security And Inventory Information Encoding Method", also assigned to the same assignee as this application, whose disclosures are hereby incorporated by reference herein, lottery tickets, promotional game cards, premium cards and other separatable documents may have a paper backing, a means for holding a magnetic code on the document itself, a metallic foil top surface, and various printing. In the case of lottery tickets, such documents may also contain an opaque removable coating in certain areas covering or obscuring some printed characters or symbols. The purchaser of the lottery ticket or user of the card having hidden indicia must remove the coating from the card in order to reveal the characters or symbols to determine whether the ticket holder is entitled to a prize. A check number or security number may be included on the document or ticket, and for security and other reasons, it is desirable to imprint the ticket with a magnetic code to verify the identity of the ticket, and guard against tampering.

Such documents may include a thin, delicate top surface of a reflective foil, as mentioned. One of the problems addressed by the present invention is how to handle such a document to imprint a code magnetically on it.

Another problem solved by the present invention is how to write magnetic information continuously, in bulk, and at high speed, on documents which can later be separated or the like.

SUMMARY OF THE INVENTION

According to various aspects of the present invention, lottery tickets or other documents to be magnetically encoded are processed in bulk form, preferably at high speed. More particularily, a web of perforated material is transferred from a supply reel to a take-up reel at high speed, passing sequentially by an encoding station. A magnetic head is controlled to be spaced from the top surface of the documents by means illustratively of an assembly having wheels or rollers which ride upon the surface of the moving web. Such assembly, referred to herein as a "skate," supports the magnetic write head a distance spaced from the outer wheel surfaces.

Each skate includes multiple wheels and supports not only a magnetic write head, but also a magnetic read head. Preferably the read head is also spaced from the web. An inkjet print head is supported next to the skate for writing ink next to the magnetic write head.

Preferably, the web is sufficiently wide that plural items to be encoded may move in parallel from the supply reel to the take up reel. In such event, several such skates are used and are spaced laterally apart so that plural lottery tickets or the like can be magnetically encoded uniquely and printed simultaneously, prior to bursting perforations and separating the web into plural individual tickets or individual groups of tickets.

The arrangement permits continuous writing magnetically at a prescribed location relative to each document.

BRIEF DESCRIPTION OF THE DRAWINGS

In describing a preferred embodiment of the present invention, reference is made to accompanying drawings wherein:

FIG. 1 is a diagrammatic illustration of a system according to various aspects of the present invention;

FIG. 2 illustrates a perspective view of lottery tickets or the like in bulk form passing beneath an encoding apparatus according to various aspects of the present invention;

FIG. 3 illustrates a bottom view of the encoding apparatus shown in FIG. 2;

DESCRIPTION OF A PREFERRED EMBODIMENT

Figure 4:
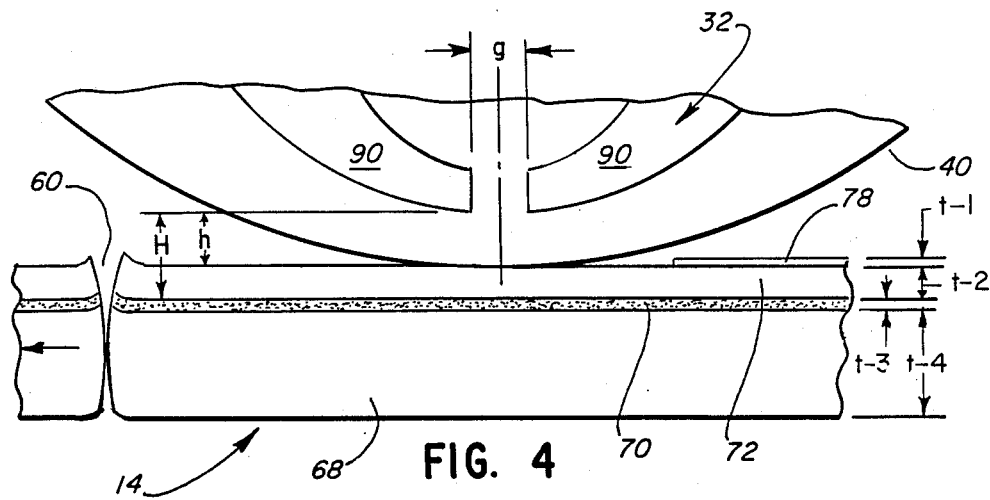
FIG. 4 is a representative sectional view in enlarged scale of a portion of the FIG. 2 embodiment.

FIG. 1 is a representational illustration of a representative system 10 according to various aspects of the present invention. System 10 includes a supply wheel 12 which is rotatably mounted for supplying a web 14 of items to be encoded and then collected at a take-up reel 16. The encoding occurs when web 14 passes under an encoding apparatus 18 (shown in broken lines) to which is coupled to various standard electronic or electromechanical circuitry 20. It should be understood that supply wheel 12 and take-up wheel 16 are representational and that a system of rollers, wheels or rotating drums can be used with the objective of passing web 14 relative to encoding apparatus 18 preferably high speed. In the preferred embodiment, web 14 moves at a speed of approximately 300 feet per minute to up to 400 feet per minute past apparatus 18. Illustratively, wheels 12 and 16 are eight feet apart.

Turning to FIG. 2, a perspective view of encode apparatus 18 relative to the moving web 14 is depicted. A pair of legs 22 support a cross member 24 over web 14. The main function of legs 22 and cross member 24 is to support one or more skates 26 and ink jets 34 proximate to web 14. As shown in FIG. 2, two such skates 26 are illustrated, each coupled to cross member 24 by corresponding skate mounts 28. It will be understood that while only two skates 26 are illustrated, it is expected that plural skates will be mounted so that a greater number of items in a side-by-side relation on web 14 can be encoded as they pass under apparatus 18.

A primary function of each skate 26 is to maintain a magnetic write head spaced from the top surface of moving web 14. One problem overcome by the present embodiment is that the top surface of web 14 can be extremely delicate, and the magnetic head therefore should not directly contact the upper surface thereof if high speed encoding is to occur. On the other hand, if a magnetic write head is spaced too far from the top surface of web 14, the magnetic signal which is encoded on web 14 becomes too weak. The present embodiment resolves these competing considerations by providing wheels 30 which contact and rotate along the upper surface of web 14 as it moves past apparatus 18 so that web 14 will be in a controlled relationship to a magnetic write head 32 (see FIG. 3) positioned illustratively between two of the wheels. Preferably, a printing device such as an inkjet printer 34 also is supported adjacent to skate 26 and held in spaced relation to web 14.

FIG. 3 can be considered in conjunction with FIG. 2 for ease of description of one of skates 26. FIG. 3, which shows a bottom view of a representative skate 26, shows that each skate 26 according to the preferred embodiment includes four wheels. One portion of skate 26 includes a thick wheel 40 and a thin wheel 42 both mounted illustratively on a single axle 44. Another portion of skate 26 includes a second thick wheel 46 and a half thickness wheel 48 both mounted on a second axle 50. Preferably all wheels 40, 42, 46 and 48 have the same diameter, illustratively about 2–5 inches. Illustratively, each pair of wheels is separated by about 3 inches center-to-center. The wheels can be formed of a hard synthetic material such as nylon or other hard plastic, or can be formed of aluminum or other materials. As can be seen, a carriage 52 supports the axles and wheels. The axles are perpendicular to the direction of movement of web 14 past apparatus 18 and past each skate 26.

Magnetic write head 32 illustratively is positioned between wheels 40 and 42 and is mounted on carriage 52. Inkjet print head 34 is mounted next to thin wheel 42 by a means coupled to legs 22 or cross member 24. Illustratively, a magnetic read head 54 is mounted on carriage 52 between wheels 46 and 48. It will be appreciated that one can vary the location of heads 32, 34 and 54 relative to the wheels and carriage. Illustratively, heads 32 and 34 are positioned directly beneath axle 44 whereas read head 54 is positioned beneath axle 50. It should also be appreciated that the use of four wheels is simply illustrative, and a greater or lesser number of wheels can be employed with corresponding adjustment of the shape of the supporting carriage. Indeed, the use of wheels is a preferred embodiment but other approaches consistent with the present invention can be employed to space one or more heads from a moving web. For example, pressurized air can be employed under appropriate control to control a gap between the heads and moving web 14.

The preferred embodiment, however, uses large and small (width) wheels of equal diameter on a skate 26 whose front portion has a width approximately the same as the width of the back portion. Further, the fact that wheels 42 and 48 have differing thicknesses reduces the tendency to create a "rut" in the moving web. Wheels 40, 46 illustratively are shown with the same thickness and are aligned, but these can be modified to minimize the formation of any ruts.

Figure 5:
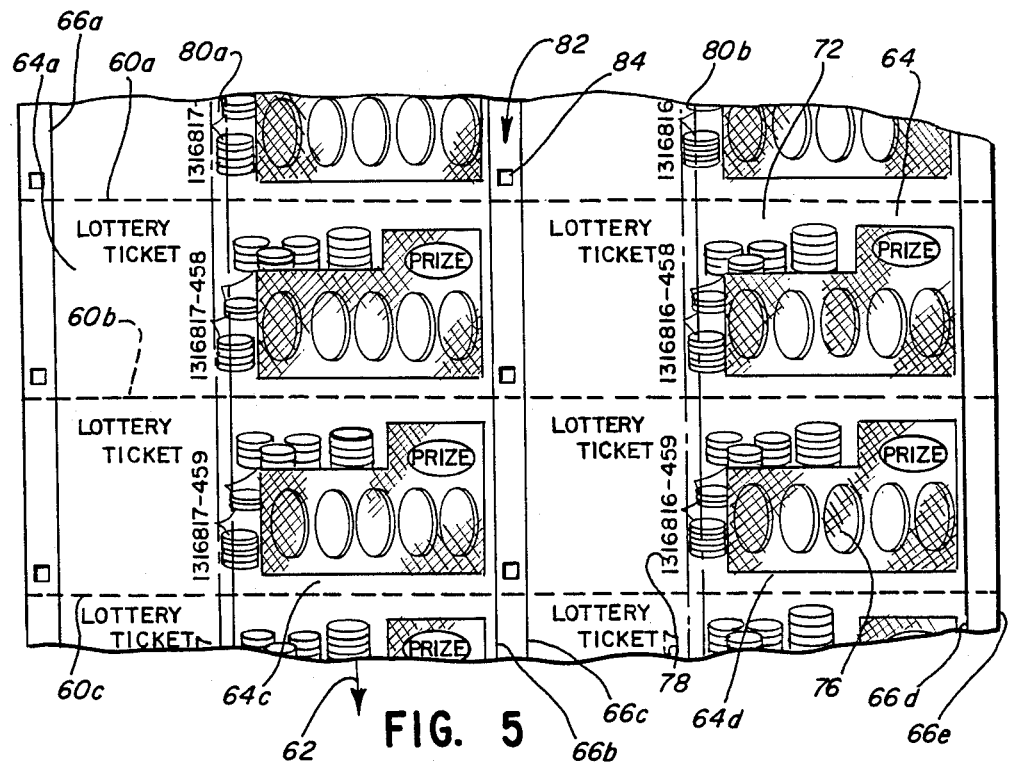
FIG. 5 depicts a representative lottery ticket processed by the assembly of FIG. 2.

FIG. 4 is a sectional view in greatly expanded scale showing the relationship in the preferred embodiment of magnetic write head 32 to web 14 as it passes by. FIG. 5 depicts a plan view of a representative item, such as a lottery card, processed according to the present invention. Details concerning a card to be encoded are described in the aforementioned Behm, Hurst, Rice and Cohen patent application, the disclosure of which is incorporated by reference. Suffice it to say, however, for purposes of the present discussion that web 14 comprises a perforated laminate structure with perforations illustratively running perpendicular to the direction of movement of web 14 relative to apparatus 18. Thus, such perforations at any given moment will be parallel to the axes of rotation of supply wheel 12 and take-up reel 16 as depicted in FIG. 1 and of axles 44, 50.

Illustratively, the laminate structure of web 14 will become lottery tickets as illustrated in FIG. 5. As shown there, perforations 60a, b, c . . . are perpendicular to the direction of movement of web 14 which is indicated by an arrow 62. The group shown in full in FIG. 5 will become four lottery tickets after further processing, but it can be seen that multiple lottery tickets can be formed in each portion of web 14 corresponding to a perforation. That is to say, perforations 60a and 60b define a group of lottery tickets 64a, 64b which are in side-by-side configuration. It will be understood that more than two tickets 64a, 64b can be defined by perforations 60a, 60b, and it is contemplated that a larger number of such tickets be processed simultaneously, with a corresponding increase in the number of skates 26 or encoding apparatus 18 being provided. Tickets 64a, 64b move in parallel past encoding apparatus 18. Two further tickets 64c, 64d follow in parallel, sequentially behind tickets 64a, 64b.

It will be appreciated that the lottery tickets will be obtained from web 14 after processing by bursting perforations 60a, b, . . . and by cutting along several cut lines represented in FIG. 5 as cut lines 66a, b, c, d, e, . . .

It will be noted that various printing visible to the naked eye is included on each lottery ticket 64. Referring to both FIG. 4 and FIG. 5, the separate parts of each lottery ticket 64 are distinguished. First, a substrate 68 is provided illustratively by 11.0 mils of paper. A magnetic adhesive forms a layer 70 on top of paper substrate 68, and illustratively is about 0.1 mils thick. It is layer 70 which, in selected parts, becomes magnetically encoded by the system and method of the present invention. Next, another layer 72 illustratively of aluminum foil which illustratively is 0.3 mils thick sits on top of layer 70. Foil layer 72 provides an attractive top surface for each lottery ticket 64. Various ink printing 74 can be placed on top of layer 72 to identify the type of ticket, such as a lottery ticket, being formed. Additionally, printing 74 may include various indicia which should be uncovered at a subsequent time by a purchaser or user of ticket 64. Some of printing 74 may be covered, accordingly, by an opaque latex 76. It will be understood that printing 74 and latex 76 need not be included on web 14 prior to magnetic encoding. This can be done either before or after the encoding by the present system.

However, further printing 78 preferably occurs via the present system 10. Such printing 78 is done via inkjet print head 34 (FIGS. 2, 3) and will include, illustratively, a control number as depicted in FIG. 5. Illustratively, each separate ticket 64 receives a respective control number at a prescribed position on ticket 64. One object of the present invention is to provide magnetic encoding on a web 14 forming such tickets 64 or other devices corresponding preferably to the information stated by printing 78. Referring to FIG. 5, such magnetic encoding occurs within a band 80 which illustratively is directly adjacent to printing 78.

In the preferred embodiment, it is noted that tickets 64a and 64b are separated by a track 82. Preferably, each track includes a cue mark 84 which can be sensed by apparatus (not shown). Preferably, cue marks 84 are dark spots on the reverse side of the ticket, that is, on the bottom of the substrate 68. A photocell mounted beneath web 14 optically senses the intensity of light reflected by track 82. The dark spots forming cue marks 84 are detected by the photocell and signify a starting position for magnetic encoding of the adjacent ticket. Alternatively, mark 84 can be a region where magnetic dipoles are oriented in a specific manner which will be sensed by an additional magnetic read head. These are but two examples of systems which can be provided to indicate the relative position of perforations 60 as they pass under skate 26 and particularly magnetic write head 32 thereof. Other possibilities would include, but are not limited to, sensors for sensing perforations 60 cooperating with a timing circuit to identify positions on each ticket 64 as it moves underneath write head 32; or an error correction circuit can cooperate with a read head which reads either optically visible printing 78 placed on ticket 64 by inkjet print head 34 or a magnetic read head 54 which reads the code placed on each ticket 64 by magnetic write head 32. If the position of either or both of such printing or encoding is improper relative to the ticket, then a correction in a timing circuit or the control circuits for the magnetic write head or inkjet print head can be made to compensate for the error so that further tickets would not be printed or encoded at improper locations. It is a routine matter to establish the location of a web as it passes by a prescribed location, and further details need not be given in this specification, as the skilled artisan will appreciate the various approaches which can be taken to develop such information.

Having established proper timing information, which corresponds to positional information on each ticket 64, magnetic write head 32 and inkjet print head 34 are activated to encode and imprint each ticket 64 passing under skate 26. It is preferred to include read head 54 or the purpose mainly of reading the magnetically encoded information and cooperating with associated support circuitry 20 to verify that the correct magnetic message indeed has been encoded.

FIG. 4 shows that magnetic write head 32 includes a gap (of width g) between two spaced ends 90 of the write head. Illustratively, this gap is about 1.0 mils. FIG. 4 also shows that the periphery of the wheels 30 (illustratively wheel 40) spaces ends 90 from the upper surface of web 14 (the "web-to-head gap") by a controlled distance h. Illustratively, the web-to-head gap h will be set off-line, that is, in preparation for production running. The skate is oriented relative to the web so that it is pressed against the moving web only by web tension. The wheels deflect the web by about 0.2 inches in the preferred embodiment where wheels 12 and 16 are eight feet apart. Nominally, the head-to-web gap h is between 0.5 and 1.0 mils. This will be related to any bowing of the web toward or away from the skate. It will be appreciated that if the head touches the web, it will scratch the top foil layer 72 and mar the ticket 64, which is generally undesirable. Read head 54 is also spaced the same distance from web 14.

The charactistics of the magnetic encoding can be varied with the requirements of each user but according to the preferred embodiment comply with International Standard 3554 promulgated by the International Organization for Standardization (ISO3554-1976E), and in particular, the low density track thereof. The magnetic write signal can be binary encoded so that binary zero digits are encoded with a signal so that 150 pulses per inch are recorded. At a production speed of 300 to 450 feet per minute, binary zero digits are encoded at a frequency of 9 kilohertz, whereas binary one digits are encoded at a frequency of 18 kilohertz.

Ticket 64 has a nominal width between perforations 60 of approximately 1.4 inches. The pulse record density of 150 pulses per inch allows recording of a significant number of numerals or alpha-numeric characters in the magnetic adhesive. Preferably this results in encoding 15 characters per inch, and illustratively 16 characters are recorded.

It will be appreciated that the recording occurs through and notwithstanding the presence of aluminum foil layer 72. In the preferred embodiment, write head 32 uses a 100-turn coil and draws a current of 100 milliamps. It should be noted that the recorded signal has the strength of approximately of one-sixtieth of a magnetic signal typically recorded on a credit card magnetic stripe. This low signal strength actually contributes to the security of the present system in that it becomes more difficult to read or record counterfeit information at such a low signal strength.

Inkjet head 34 illustratively is a VideoJet manufactured by A. B. Dick, and has customary construction. It comprises, in terms of external dimensions, a 1.25 inch diameter tube which is substantially 7.5 inches in length. Inkjet head 34 prints indicia 78 on lottery tickets 64 which, when returned or presented for payment as winning lottery tickets, can be compared to the magnetic code placed in band 80. FIG. 1 illustrates in block form associated electric support circuitry 20 as including a write circuit, an inkjet control circuit, a read circuit and a verify write circuit. The read head 54 may comprise a multitrack or single track reader which, together with its support circuitry, verifies that correct information has been encoded, or can verify merely that some magnetic code has been written.

In conclusion, it will be appreciated that what has been described is a system capable of bulk writing of magnetic information on a web of a laminate structure having a delicate upper surface—notwithstanding which writing occurs at high speeds. The embodiment described and illustrated herein uses one or more rollers or wheels to offset one or more heads from the moving web, but other means such as pressurized air can be substituted for achieving this function. In the preferred embodiment, plural skates are supported by a cross member beneath which the moving web passes. Thus, plural lottery tickets or the like can be coded in side-by-side fashion simultaneously. Ink printing can occur at high speeds according to the invention, and in a further aspect the magnetically encoded information is verified. After the bulk material is bulk written at high speed in the manner described herein, the individual items can be separated by bursting the perforations and slicing the perforated laminate along cut lines normal to the perforations. The present system achieves these objects while using a composite laminate as the device to be printed upon and encoded, even permitting the upper layer thereof to be metalized by aluminum foil or other metallic materials. In the embodiment herein described, the composite laminate comprises a paper board substrate having a polyvinyl acetate adhesive material admixed with particulate magnetic material such as chrominum dioxide covered with a metallic foil.

While lottery tickets have been illustrated, the composite laminate can be used for other purposes such as a low cost credit card magnetically encoded with a prepaid credit limit which is later sensed and magnetically rewritten as credit is utilized. The bulk processing aspect allows such documents to be created at low cost.

It will be appreciated that various modifications can be made to the embodiment described herein, and that such modification is within the scope of the present invention which is defined herein by the appended claims.

We claim:

1. A method for magnetically encoding information onto plural objects comprising the steps of:
   providing a supply of objects to be magnetically encoded;
   passing said objects proximate to a magnetic write head;
   maintaining said write head a spaced distance from the surface of said objects by supporting said write head on a carriage and controlling a gap between the top surface of said objects to be encoded and said write head by mechanically constraining said moving objects from passing substantially through an imaginary plane;
   while said objects pass proximate to said write head, writing magnetically within a track on said object; then
   separating said objects into units or groups of units.

2. The method according to claim 1 wherein said providing step comprises providing a sequence of objects to be encoded in a continuous web of adjacent ones of said objects.

3. The method according to claim 2 wherein said web includes perforations separating adjacent objects to be encoded, said method further comprising separating said objects along said perforations after said magnetically writing step.

4. The method according to claim 1 wherein said providing step comprises providing bulk material including said objects to be encoded, each of said objects being positioned adjacent to another one thereof,
   wherein said passing step comprises passing plural ones of said objects proximate to plural magnetic write heads spaced laterally apart,
   wherein said maintaining step comprises maintaining each write head a spaced distance from the object passing therebeneath,
   wherein said writing step comprises writing magnetically within respective tracks on said objects passing beneath said write heads; and
   wherein said separating step includes dividing said supply into discrete recorded objects.

5. The method according to claim 4 wherein said providing step further comprises providing a sequence of adjacent objects to be encoded.

6. The method according to claim 2 wherein said providing step comprises moving said objects to be encoded past said write head at a high speed.

7. The method according to claim 5 wherein said providing step comprises moving said objects past respective write heads at high speed.

8. The method according to claim 1 wherein said mechanical constraining step comprises mounting a wheel for rotation about an axis, said axis being in a fixed relationship with said write head.

9. The method according to claim 1 further comprising reading magnetic code from said track to verify the recording thereon.

10. The method according to claim 1 further comprising printing indicia on the surface of said objects to be encoded in conjunction with said magnetically writing step.

11. A method of encoding a plurality of objects at high speed in bulk form comprising the steps of:
    providing a supply of objects to be encoded, including providing a web separable into a sequence of strips, each strip including material for one or more objects to be encoded;
    passing said web proximate to one or more magnetic write heads;
    maintaining each write head a spaced distance from said web as it passes thereunder by guiding said web under a set of rollers supported by a carriage to which a respective write head is coupled, the relationship of said roller periphery to said write head defining said spaced distance;
    writing magnetically within respective tracks corresponding to said magnetic write heads as said web passes under said write heads; and
    separating strips which have been magnetically encoded to form a plurality of separate magnetically encoded items.

12. The method according to claim 11 further comprising reading information recorded in said tracks to verify the encoding thereof by said write head.

13. The method according to claim 11 further comprising writing visible indicia on said web as it passes under said carriage in predetermined locations.

14. Apparatus for encoding a plurality of objects magnetically at a high speed comprising;
    means for passing a supply of material proximate to an encoding apparatus;
    an encoding apparatus including a magnetic write head and means coupled to said magnetic write head for spacing the surface of said material to be encoded from said write head including a set of rollers mounted in a spaced relationship from the surface of said write head, said rollers being positioned to engage the upper surface of said supply material and being comfigured to constrain said supply material from approaching said surface of said write head by more than a prescribed gap.

15. In combination:
    a web of magnetically encodable material configured as a plurality of several elongated strips;
    means for moving said web along a predetermined route;
    an encoding apparatus positioned along said route and including a magnetic write head supported in a skate apparatus, said skate apparatus including a set of rollers mounted for rotation about an axis which is perpendicular to the direction of movement of said web past said encoding apparatus, whereby said web may engage said rollers as said web moves past said encoding apparatus and rotate said rollers, said write head being a controlled distance from the periphery of said rollers.

16. The combination of claim 15 wherein the magnetically encodable material comprises a carrier for magnetic material and a covering layer of metal foil, and the set of rollers engaging the metal foil while maintaining the write head a spaced distance above the metal foil.

17. A method for magnetically encoding information onto plural objects comprising the steps of:
    providing a supply of objects to be magnetically encoded;
    passing said objects proximate to a magnetic write head;

maintaining said write head a spaced distance from the surface of said objects by passing said supply of objects to be encoded along one or more rollers supported by a carriage to which said write head is engaged, the circular perimeters of said one or more rollers preventing said objects to be encoded from approaching said write head by more than a controlled distance while said objects pass proximate to said write head, writing magnetically within a track on said object; then separating said objects into units or groups of units.

18. Apparatus for encoding a plurality of objects magnetically at a high speed comprising;

means for passing a supply of material proximate to an encoding apparatus;

an encoding apparatus including a magnetic write head and means coupled to said magnetic write head for spacing the surface of said material to be encoded from said write head including a skate apparatus having a set of rollers mounted for rotation about an axle, a carriage coupled to said axle, said carriage engaging said write head, said rollers being oriented to contact the top surface of said supply as it passes proximate to said encoding apparatus and to prevent said material from touching said write head.

19. The apparatus according to claim 18 wherein said skate apparatus further comprises a further set of rollers mounted for rotation about a further axle, said further axle supported by said carriage, said rollers having substantially equivalent diameters, said wheels being oriented to rotate about an axis perpendicular to the direction of movement of said material past said encoding apparatus.

* * * * *